United States Patent
Hayashi et al.

[11] Patent Number: 6,134,497
[45] Date of Patent: Oct. 17, 2000

[54] VEHICLE RUNNING CONTROL APPARATUS AND VEHICLE RUNNING CONTROL METHOD

[75] Inventors: Yuichiro Hayashi, Okazaki; Kazuya Hayafune, Nishikamo-gun; Kiichi Yamada, Nagoya, all of Japan

[73] Assignee: Mitsubishi Jidosha Kogyo Kabushiki Kaisha, Tokyo, Japan

[21] Appl. No.: 09/099,140

[22] Filed: Jun. 18, 1998

[30] Foreign Application Priority Data

Jun. 20, 1997 [JP] Japan ................................. 9-164798

[51] Int. Cl.$^7$ .............................. G06F 7/70; G06F 19/00; G06G 7/00; G06G 7/76
[52] U.S. Cl. .............................. 701/70; 701/96; 701/301; 340/435; 340/903; 342/455
[58] Field of Search ................................. 701/70, 96, 78, 701/53, 301, 91; 342/455; 340/903, 901, 902, 904, 435, 436

[56] References Cited

U.S. PATENT DOCUMENTS

| | | | |
|---|---|---|---|
| 5,165,497 | 11/1992 | Chi | 180/169 |
| 5,278,764 | 1/1994 | Iizuka et al. | 701/301 |
| 5,375,060 | 12/1994 | Nocker | 701/301 |
| 5,510,990 | 4/1996 | Hibino et al. | 701/96 |
| 5,572,449 | 11/1996 | Tang et al. | 364/528.39 |
| 5,670,953 | 9/1997 | Satoh et al. | 340/3 |
| 5,708,584 | 1/1998 | Doi et al. | 701/96 |
| 5,806,019 | 9/1998 | Ishiyama | 701/300 |
| 5,808,561 | 9/1998 | Kinoshita et al. | 340/903 |
| 5,850,176 | 12/1998 | Kinoshita et al. | 340/435 |
| 5,902,345 | 5/1999 | Minowa et al. | 701/96 |
| 5,938,714 | 8/1999 | Satonaka | 701/96 |
| 5,955,941 | 9/1999 | Pruksch et al. | 340/435 |
| 6,006,144 | 12/1999 | Takahashi et al. | |

*Primary Examiner*—William A. Cuchlinski, Jr.
*Assistant Examiner*—Olga Hernandez

[57] ABSTRACT

A vehicle running control apparatus for a motor vehicle is provided which is able to accomplish a braking operation that meets with the driver's intention when the vehicle is decelerated under running control, while assuring improved safety. During deceleration control, target deceleration calculating device calculates a target deceleration degree αa of the subject vehicle in accordance with a deceleration degree of the preceding vehicle (S30). When the target deceleration degree αa is smaller than a predetermined deceleration degree X1, braking control device controls an operation of an actuator so as to drive a brake system to generate braking force that corresponds to the target deceleration degree αa (S32, S36). When the target deceleration degree αa is equal to or greater than the predetermined deceleration degree X1, on the other hand, the actuator is operated so as to drive the brake system to generate auxiliary braking force that corresponds to the predetermined deceleration degree X1 (S32, S34, S36).

18 Claims, 3 Drawing Sheets

VEHICLE RUNNING CONTROL APPARATUS AND VEHICLE RUNNING CONTROL METHOD

FIELD OF THE INVENTION

The present invention relates in general to a running control apparatus for a motor vehicle, and a method of controlling running of the vehicle, and more particularly to a technique for controlling deceleration of the vehicle during running control.

BACKGROUND OF THE INVENTION

In recent years, a running control apparatus for an automobile which is equipped with a following distance control device has been developed and put into practical use, so as to enable the vehicle to follow or track a preceding vehicle, thereby to reduce the effort of the driver in a driving the automobile.

The running control apparatus equipped with the following distance control device is adapted to detect a following distance between the vehicle (hereinafter referred to as subject vehicle) and the preceding vehicle, based on information obtained from a forward recognition sensor, such as a camera and a laser radar, and control the vehicle speed by adjusting the engine output, or the like, so that the following distance becomes equal to a predetermined target following distance. The subject vehicle follows or tracks the preceding vehicle at the speed controlled in this manner.

Recently, there has been also proposed an apparatus that enables the subject vehicle to be decelerated by automatically actuating or operating a brake system when the preceding vehicle is decelerated, as disclosed in Japanese laid-open Patent Publication No. 7-65297.

In the apparatus disclosed in the above-identified publication, the speed of the subject vehicle is automatically reduced, namely, brakes are automatically applied to the subject vehicle, even where the preceding vehicle is decelerated by a large degree. Although the subject vehicle may be completely automatically braked or decelerated in accordance with the deceleration degree of the preceding vehicle, the resulting braking state of the vehicle does not always meet with the driver's intention. If the automatic braking does not meet with the driver's intention, the driver or other passenger of the vehicle may feel uncomfortable or disagreeable.

In the case where the vehicle needs to be decelerated by a large deceleration degree, therefore, it has been proposed to allow the driver to operate a brake pedal, namely, perform a normal braking action according to the driver's intention even during tracking running control. However, the operation of the brake pedal by the driver tends to be delayed, in view of the response of the driver to the deceleration of the preceding vehicle, namely, the time required for the driver to start operating the brake pedal, and it is thus necessary to provide a certain margin or excess time before the brake pedal is actually operated by the driver.

SUMMARY OF THE INVENTION

It is therefore an object of the present invention to provide a vehicle running control apparatus and a running control method, which realize a braking operation that fulfills the driver's intention when the vehicle is decelerated under running control, while assuring improved safety.

To accomplish the above object, the present invention provides a vehicle running control apparatus which performs running control by controlling the vehicle speed of the vehicle so that the following distance between the subject vehicle and a preceding vehicle that runs on the same lane as the subject vehicle becomes equal to a target following distance, wherein deceleration control is performed by initially causing preceding vehicle deceleration degree detecting means to detect the deceleration degree of the preceding vehicle, and causing target deceleration degree calculating means to calculate the target deceleration degree of the subject vehicle that corresponds to the deceleration degree of the preceding vehicle. This apparatus further includes braking control means for controlling an operation of an actuator so as to drive a brake system to generate a braking force that corresponds to the target deceleration degree when the target deceleration degree is smaller than a predetermined deceleration degree, and controlling the operation of the actuator so as to drive the brake system to generate a braking force that corresponds to the predetermined deceleration degree when the target deceleration degree is equal to or greater than the predetermined deceleration degree.

In the apparatus as described above, if the deceleration degree is clipped to the predetermined deceleration degree when the target deceleration degree is equal to or greater than the predetermined deceleration degree, the braking force automatically applied by the actuator is limited or restricted, and the apparatus performs an automatic braking operation as auxiliary braking means until the brake pedal is actually operated by the driver. Thus, even where the speed of the preceding vehicle is suddenly reduced by a large degree, the subject vehicle is prevented from being automatically decelerated, namely, automatic braking for largely reducing the vehicle speed can be avoided, whereby the driver is prevented from feeling uncomfortable or disagreeable.

If the actuator is operated by the apparatus to perform automatic braking to thus function as auxiliary braking means, a margin time or excess time required for the driver to hit the brake pedal can be increased, and therefore a delay in the operation of the brake pedal by the driver can be avoided, thus assuring improved running safety of the vehicle during deceleration control.

In one feature of the present invention, the predetermined deceleration degree is determined so that when the target following distance is shorter than a predetermined following distance that corresponds to a given free running time that is at least sufficient period required to be taken until the driver starts operating the brake pedal, the margin time up to the start of the operation of the brake pedal by the driver becomes equal to or larger than the given free running time where the actuator is operated so as to generate braking force corresponding to the predetermined deceleration degree.

Accordingly, even in the case where the preceding vehicle is decelerated by a large degree, and the target deceleration degree of the subject vehicle is accordingly large, the margin time to be taken until the brake pedal is actually operated can be set to be equal to or larger than the predetermined free running time as at least sufficient period of time required by the driver to operate the brake pedal. Thus, a sufficient margin time can be provided, and a delay in the operation of the brake pedal by the driver can be favorably avoided.

DETAILED DESCRIPTION OF THE PREFERRED EMBODIMENT

Figure 1:
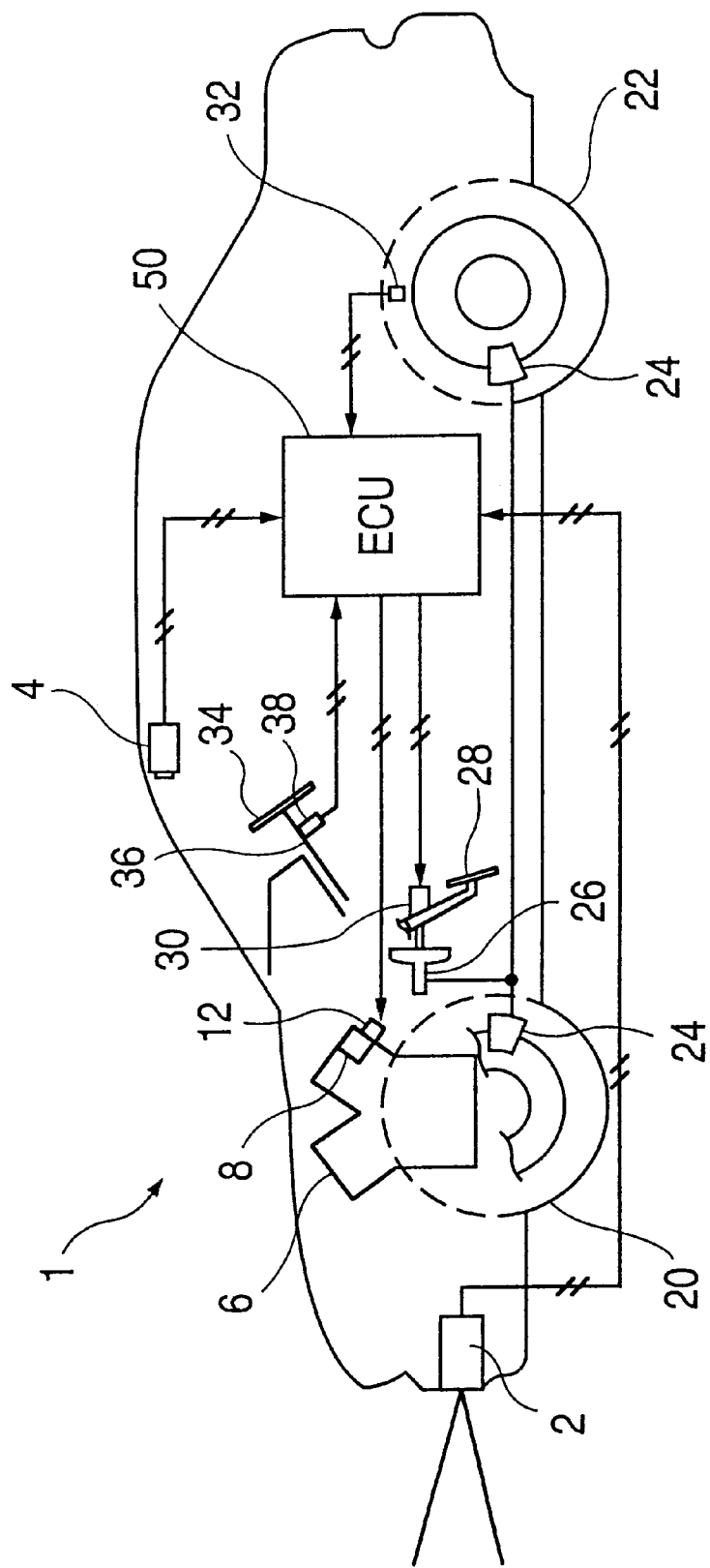
FIG. 1 is a schematic view showing the construction of a running control apparatus according to one embodiment of the present invention, which apparatus is installed on an automotive vehicle.

FIG. 1 is a schematic view showing the construction of a running control apparatus according to one embodiment of the present invention, which apparatus is installed on an automotive vehicle 1. The construction of this running control apparatus will be described in detail with reference to FIG. 1.

In the front part of the vehicle 1, a laser radar 2 is provided which is able to recognize an object that is present in front of the vehicle 1, and measure a distance between the vehicle 1 and the object, by emitting a laser beam forward and scanning the laser beam reflected by the object. Also, a CCD camera 4 for capturing an image as viewed in front of the vehicle 1 is mounted in a roof portion within the vehicle compartment. This CCD camera 4 is capable of recognizing objects, lanes and others that are located ahead of the vehicle.

To an engine 6 of the vehicle 1 is connected a throttle valve 8 for controlling the amount of intake air into the engine 6 so as to adjust the output of the engine. More specifically, the throttle valve 8 is provided with a throttle actuator 12 capable of automatically adjusting the throttle opening of the valve 8 according to an actuation signal generated from an electronic control unit (ECU) 50 which will be described later, depending upon the degree of depression of an accelerator pedal (not shown) and so on.

Service brakes (braking devices) 24, such as hydraulic disk brakes, are respectively provided on a pair of right and left front wheels (drive wheels) 20, 20 and a pair of right and left rear wheels (driven wheels) 22, 22. The service brakes 24 are connected to a brake pedal 28, via a brake master cylinder 26 including a vacuum booster. The brake master cylinder 26 is provided with a vacuum-type brake actuator 30 that is capable of automatically actuating or operating the service brakes 24 according to an actuation signal from the ECU 30, regardless of the input from the brake pedal 28 indicative of the force applied to the brake pedal 28.

Wheel speed sensors 32, 32 are provided in the vicinity of the rear wheels 22, 22 as driven wheels, respectively, for detecting the rotating speeds of the right rear wheel $V_{SR}$ and left rear wheel $V_{SL}$. These wheel speed sensors 32, 32 function as vehicle speed detecting means for detecting the vehicle speed V.

A switch 38 for switching the running control apparatus of the vehicle 1 between an ordinary running mode and a running mode under tracking running control is provided on a steering column 36 of a steering wheel 34 provided in the vehicle compartment of the vehicle 1. If the switch 38 is operated to the ON state, tracking running control, namely, following distance control, is started. If the switch 38 is operated to the OFF (reset) state, on the other hand, the following distance control is canceled.

The ECU 50 is a main control device that is in charge of various controls of the vehicle 1. To the input side of the ECU 50 are connected various sensors and switches, including the laser radar 2, CCD camera 4, wheel speed sensors 32, 32, and the switch 38. On the other hand, various drive devices, such as throttle actuator 12 and brake actuator 30, are connected to the output side of the ECU 50.

Figure 2:
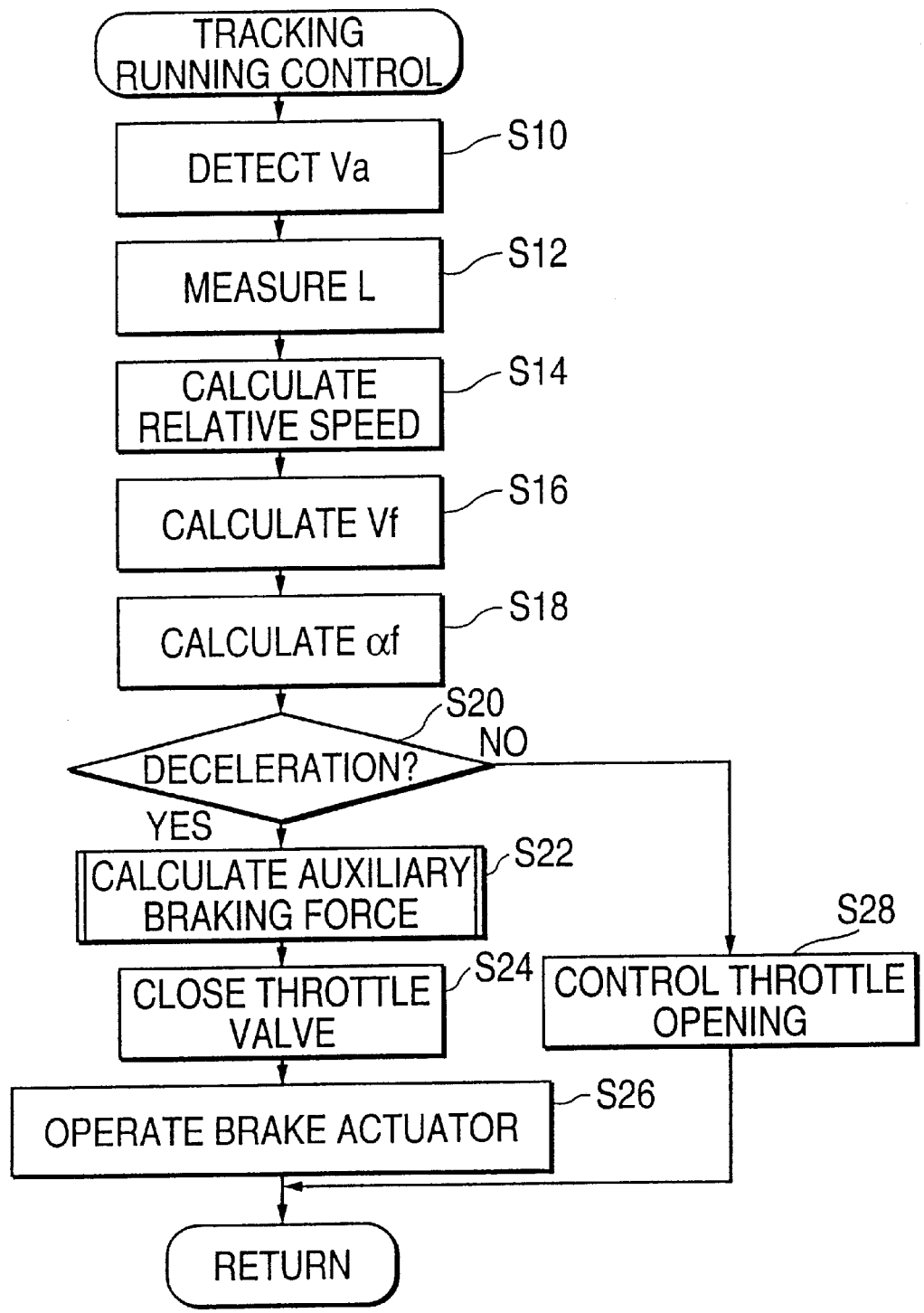
FIG. 2 is a flowchart showing a tracking running control routine according to the present invention.

The content of control of the running control apparatus constructed as described above will be now explained. Referring to FIG. 2 showing a flowchart of a tracking running control routine, a routine of tracking running control according to the present invention will be explained.

If the switch 38 is operated to the ON state, and tracking running control is started, step S10 is initially executed to calculate the vehicle speed Va of the vehicle 1, i.e., subject vehicle, based on information received from the wheel speed sensors 32, 32. More specifically, the vehicle speed Va is calculated from the equation (1) as follows:

$$Va=(V_{SR}+V_{SL})/2 \quad (1)$$

Then, a preceding vehicle is recognized based on information received from the laser radar 2 and the CCD camera 4, and the control flow goes to step S12 in which the distance L from the subject vehicle 1 to the preceding vehicle is detected by the laser radar 2 with high accuracy.

Step S14 is then executed to calculate the relative speed between the subject vehicle and the preceding vehicle, based on the distance information L obtained in step S12. More specifically, the relative speed is calculated based on an amount of change ΔL between the last value of the distance L obtained during execution of the last control cycle, and the current value of distance L obtained in the current control cycle. If the amount of change ΔL is a positive value, one can assume that the subject vehicle is being away from the preceding vehicle, namely, the distance between the subject vehicle and the preceding vehicle is being increased. If the amount of change ΔL is a negative value, one can assume that the subject vehicle is approaching the preceding vehicle.

In step S16, the vehicle speed Vf of the preceding vehicle is calculated based on the vehicle speed Va of the subject vehicle and the relative speed. In the next step S18, the vehicle speed Vf of the preceding vehicle is differentiated so as to calculate the deceleration degree αf of the preceding vehicle. More specifically, the deceleration degree αf is calculated based on an amount of change ΔVf between the last value of preceding vehicle speed Vf obtained during execution of the last control cycle, and the current value of preceding vehicle speed Vf obtained in the current control cycle.

Step S20 is then executed to determine whether the subject vehicle should be decelerated or not. Namely, this step determines whether the amount of change ΔL is a negative value, indicating that the subject vehicle is approaching the preceding vehicle, thereby to determine the necessity of decelerating the vehicle 1.

If a negative decision (No) is obtained in step S20, which means that the amount of change ΔL is a positive value and the subject vehicle need not be decelerated, the control flow goes to step S28 in which the throttle actuator 12 is operated to control the opening of the throttle valve 8, so as to perform acceleration control so that the following distance L (distance between the subject vehicle 1 and the preceding vehicle) becomes equal to a target following distance Ls which will be described later.

If an affirmative decision (Yes) is obtained in step S20, which means that the subject vehicle 1 should be decelerated, the control flow goes to step S22.

In step S22, an auxiliary braking force to be generated to decelerate the vehicle 1 is calculated. More specifically, the brake actuator 30 is automatically operated in a situation that the subject vehicle should be decelerated, so as to cause the service brakes 24 to generate auxiliary brake force. In step S22, the auxiliary braking force to be added in this situation is calculated. To calculate the auxiliary braking force, a subroutine of FIG. 3 for calculating the auxiliary braking force is implemented. The processing for calculating the auxiliary braking force will be now explained below.

Figure 3:
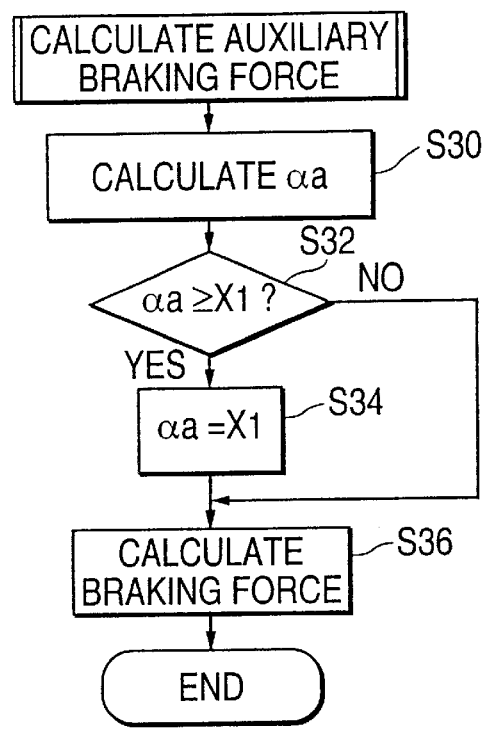
FIG. 3 is a flowchart showing a subroutine for calculating auxiliary braking force, which is executed during the control routine of FIG. 2.

In step S30 of FIG. 3, a target deceleration degree αa of the subject vehicle is calculated. The target deceleration degree αa is calculated according to the following equations (2), (3), depending upon the following situations.

In the case where the preceding vehicle is being decelerated, $$\alpha a = Va^2 / \{2 \cdot (L-Ls) + (Vf^2/\alpha f)\} \quad (2)$$

In the case where the preceding vehicle is running at a constant speed or being stopped, $$\alpha a = (Va-Vf)^2 / \{2 \cdot (L-Ls)\} \quad (3)$$

In the above equations, "Va" is vehicle speed of the subject vehicle, "Vf" is vehicle speed of the preceding vehicle, and "L" is distance from the subject vehicle 1 to the preceding vehicle, while "αf" is deceleration degree of the preceding vehicle. In addition, "Ls" is target following distance which is determined in advance based on the vehicle speed V. More specifically, a target vehicle-to-vehicle time between the preceding vehicle and the subject vehicle, which corresponds to the vehicle speed V, is set in advance to a predetermined value t1 (e.g., 1.5 sec) based on data obtained from a traffic census or other information, and the target following distance Is is determined based on this target vehicle-to-vehicle time t1.

After the target deceleration degree αa is calculated in the manner as described above, the control flow proceeds to step S32. In step S32, it is determined whether the target deceleration degree αa is equal to or greater than a predetermined value X1 (predetermined deceleration degree, for example, 0.24 G). This predetermined value X1 is determined in advance depending upon the target vehicle-to-vehicle time t1 (for example, 1.5 sec), in the manner as described later.

If a negative decision (No) is obtained in step S32, namely, if the target deceleration degree αa is smaller than the predetermined value X1 (for example, 0.24 G), the control flow goes to step S36 in which the braking force to be automatically generated, namely, auxiliary braking force, is calculated in accordance with the target deceleration degree αa.

Then, in step S24 in FIG. 2, a signal indicative of the auxiliary braking force obtained in step S36 is supplied to the throttle actuator 12, so as to close the throttle valve 8, and step S26 is executed to supply the signal indicative of the auxiliary braking force to the brake actuator 30. As a result, the brake actuator 30 is automatically driven by an amount corresponding to the auxiliary braking force, so that the service brakes 24 are operated to appropriately generate a desired amount of braking force. In this case, the vehicle 1 runs in a desirable manner while keeping track of the preceding vehicle, without requiring the driver to operate the brake pedal 28.

If a positive decision (Yes) is obtained in step S32, namely, if the target acceleration degree αa is equal to or greater than the predetermined value X1, the control flow goes to step S34 in which the target acceleration degree αa is set (clipped) to the predetermined value X1 (for example, 0.24 G). Step S36 is then executed to calculate the auxiliary braking force based on the predetermined value X1 (for example, 0.24 G), and automatically drive the brake actuator 30 to generate the auxiliary braking force that corresponds to the predetermined value X1. In this case, the driver is supposed to operate the brake pedal 28 to additionally apply brakes, so that the vehicle 1 follows or tracks the preceding vehicle in a favorable manner.

The tracking running control is performed in the manner as described above. In the following, there will be described in detail the reason why the target acceleration degree αa is set or clipped to the predetermined value X1 (for example, 0.24 G) when the target deceleration degree αa is equal to or greater than the predetermined value X1 (for example, 0.24 G).

Figure 4:
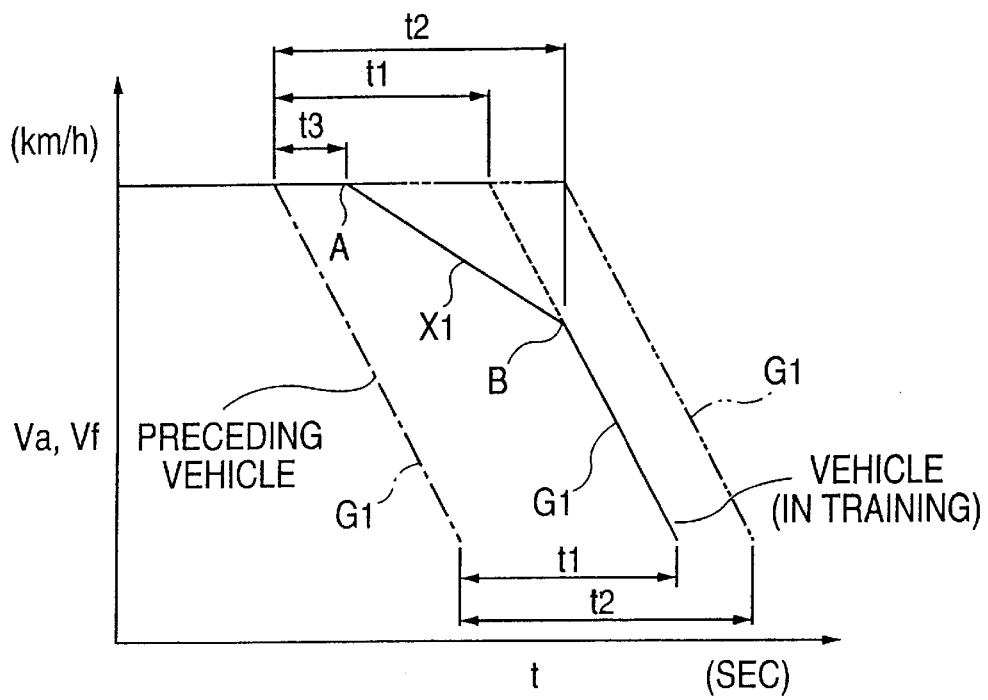
FIG. 4 is a view showing changes in the vehicle speed Vf of a preceding vehicle with time when this vehicle is decelerated by a deceleration degree G1, and changes in the vehicle speed Va of the subject vehicle when the subject vehicle is under tracking running control of the invention, using the target vehicle-to-vehicle time t1.

FIG. 4 shows changes in the vehicle speed Vf of the preceding vehicle and the vehicle speed Va of the subject vehicle with time, when the preceding vehicle is decelerated by a deceleration degree G1 (for example, 0.7 G) while the subject vehicle is under tracking running control using the target vehicle-to-vehicle time t1 (for example 1.5 sec).

Conventionally, when the speed of the preceding vehicle is suddenly reduced, namely, when the preceding vehicle is decelerated by a large deceleration degree G1 (for example, 0.7 G) as indicated by a one-dot chain line in FIG. 4, the target deceleration degree αa by which the subject vehicle is decelerated or braked is made equal to the deceleration degree G1 of the preceding vehicle, within the target vehicle-to-vehicle time t1 (for example, 1.5 sec) after braking of the preceding vehicle is started, as indicated by a broken line in FIG. 4, so that the subject vehicle can be decelerated without coming into contact with the preceding vehicle. In this case, therefore, the auxiliary braking force corresponding to the deceleration degree G1 may be generated by the brake actuator 30 so as to automatically reduce the speed of the vehicle 1.

However, totally automatic braking of the vehicle for reducing the vehicle speed by a large degree in a very short time does not always meet with the driver's intention, but may undesirably make the driver or other passenger(s) uncomfortable. It is thus desirable to brake the vehicle by allowing the driver to operate the brake pedal 28 to reduce the vehicle speed as far as possible.

It is, however, not easy for the driver to determine or judge sudden reduction in the speed of the preceding vehicle and operate the brake pedal 29 within a time period as short as the target vehicle-to-vehicle time (for example, 1.5 sec). Normally, at least a certain period of time t2 (certain free running time, for example, about 2.0 sec) is needed as a margin time required for the operation of the brake pedal 28.

According to the present invention, therefore, the target vehicle-to-vehicle time t1 is set to a short period of time (for example, 1.5 sec.), and, in addition, the minimum margin time t2 (for example, 2.0 sec.) is established as a period of time required for the driver to start operating the brake pedal after deceleration of the preceding vehicle. The above-indicated predetermined value X1 (for example, 0.24 G) is considered important when establishing the minimum margin time t2. In the following, the predetermined value X1 (for example, 0.24 G) will be described in more detail.

Referring again to FIG. 4, if the vehicle speed Va of the subject vehicle is reduced to point B or lower on the broken line in this figure at a point of time when the minimum margin time t2 (for example, 2.0 sec.) has just elapsed, the vehicle speed Va of the subject vehicle can be reduced as desired along the broken line by the driver's operation of the brake pedal 28 even where the driver starts operating the brake pedal 28 after a lapse of the minimum margin time t2.

To ensure the minimum margin time t2, therefore, the vehicle 1 may be gradually decelerated through auxiliary or automatic braking until the vehicle speed Va of the subject vehicle reaches the point "B" on the broken line in FIG. 4. The predetermined value X1 (for example, 0.24 G) is determined to be equal to a deceleration degree required for accomplishing such auxiliary braking. More specifically, with a control delay time t3 (for example, 0.5 sec.) of the brake actuator 30 taken into consideration, the deceleration degree required for the auxiliary braking to ensure the minimum margin time t2 (for example, 2.0 sec.) is determined as the slope of the line connecting point "A" and point "B" in FIG. 4. Thus, the deceleration degree for auxiliary braking, which is equal to the predetermined value X1 (for example, 0.24 G), can be uniquely determined based on the slope of the line A–B as shown in FIG. 4.

Namely, the predetermined value X1 (for example, 0.24 G) may be interpreted as a necessary and sufficient degree of deceleration by which the subject vehicle is decelerated through auxiliary braking to ensure the minimum margin time t2 (for example, 2.0 sec.) even where the vehicle speed of the preceding vehicle is greatly reduced in a very short time. Thus, even with the target vehicle-to-vehicle time t1 set to a short period of time (for example, 1.5 sec.), the driver of the subject vehicle 1 is able to surely reduce the speed of his/her own vehicle by operating the brake pedal 28 to let the vehicle follow the preceding vehicle, irrespective of any braking condition of the preceding vehicle, if auxiliary braking is performed with the deceleration degree equal to at least the predetermined value X1 (for example, 0.24 G).

FIG. 4 also shows changes in the vehicle speed Va of the subject vehicle with time (as indicated by two-dot chain line) in the case where the target vehicle-to-vehicle time is set to be equal to the minimum margin time t2 (for example, 2.0 sec.), and the subject vehicle is decelerated with the target deceleration degree αa being equal to G1 (for example, 0.7 G). In this case, a sufficient time margin for the operation of the brake pedal 29 is provided, this eliminating the necessity of auxiliary braking, and the subject vehicle can be desirably decelerated without coming into contact with the preceding vehicle. It is however possible to perform tracking running control according to the present invention, so that even where the target vehicle-to-vehicle time t1 is set to a short period of time (for example, 1.5 sec.), the minimum margin time t2 (for example, 2.0 sec.) can be ensured as in the case where the target vehicle-to-vehicle time t1 is equal to the margin time t2, thus allowing the driver to take enough time to operate the brake pedal 28 so as to safely reduce the speed of the subject vehicle to a desired level without causing any contact between the subject vehicle and the preceding vehicle.

In this connection, the predetermined time X1 (for example, 0.24 G) is such a deceleration degree that is sure to provide the minimum margin time t2 (for example 2.0 sec.) even where the speed of the preceding vehicle is greatly reduced within an extremely short time by the deceleration degree G1 (for example, 0.7 G). Where the deceleration degree of the preceding vehicle is in a region smaller than the value G1 (for example, 0.24 G–0.7 G), it will be understood that the margin time becomes longer than the value t2, as indicated in TABLE 1 below, whereby sufficient margin time can be provided until the driver starts operating the brake pedal 28.

TABLE 1

|  | Deceleration Degree of Preceding Vehicle | | | | |
| --- | --- | --- | --- | --- | --- |
|  | 0.3G | 0.4G | 0.5G | 0.6G | 0.7G |
| Margin Time (sec.) | 5.5 | 3.0 | 2.4 | 2.2 | 2.0 |

The target vehicle-to-vehicle time may be changed to be shorter or longer than the value t1 (for example, 1.5 sec), depending upon traffic conditions and other factors. Even in such a case, the deceleration degree required for auxiliary braking can be easily calculated and set based on the thus changed target vehicle-to-vehicle time and the minimum margin time t2 (for example, 2.0 sec.) on the graph of FIG. 4, according to the above-described method. Accordingly, even in the case where the target vehicle-to-vehicle time is changed, the minimum margin time t2 (for example, 2.0 sec.) can be always ensured, to enable the driver to operate the brake pedal 28 with a sufficient time margin, irrespective of braking conditions of the preceding vehicle, whereby the vehicle 1 can be safely decelerated as desired.

As explained above in detail, in the vehicle running control apparatus of the present invention, when the target deceleration degree is equal to or greater than a certain deceleration degree, the deceleration degree is clipped to be equal to the certain deceleration degree, so that the braking force that is automatically generated by the actuator can be controlled to a limited value. Thus, even in the case where the speed of the preceding vehicle is greatly reduced in a very short time, the speed of the subject vehicle is prevented from being automatically reduced by a large degree in a short time, namely, the vehicle is prevented from being suddenly braked under automatic running control, so that the driver does not feel uncomfortable during the braking operation.

Furthermore, automatic braking by means of the actuator can be utilized as auxiliary braking means, so as to increase the margin or excess time up to the point of time when the brake pedal is operated, thereby to avoid a delay in the operation of the brake pedal by the driver, thus assuring improved vehicle running safety during deceleration control.

Moreover, the margin time up to the point of time of the operation of the brake pedal can be always set to be equal to or greater than at least sufficient value even where the preceding vehicle is decelerated by a large deceleration degree and the target deceleration degree of the subject vehicle is considerably large. With a sufficiently large margin time thus provided, a delay in the operation of the brake pedal by the driver can be favorably avoided, assuring improved running safety of the vehicle.

What is claimed is:

1. A vehicle running control method for controlling running of a motor vehicle which includes a brake system that applies braking force to the vehicle and is allowed to be manipulated by a driver of the vehicle, and an actuator that drives said brake system independently of an operation of the driver, comprising:

a preceding vehicle deceleration degree detecting step for detecting a deceleration degree of a preceding vehicle that runs in front of the vehicle;

a target deceleration degree calculating step for calculating a target deceleration degree of the vehicle in accordance with the deceleration degree of the preceding vehicle; and a braking control step for controlling an operation of said actuator, so that the actuator is operated so as to drive said brake system to generate the braking force that corresponds to said target deceleration degree when the target deceleration degree is smaller than a predetermined deceleration degree, and so that the actuator is operated so as to drive the brake system to generate the braking force that corresponds to said predetermined deceleration degree when the target deceleration degree is not smaller than the predetermined deceleration degree.

2. A vehicle running control method according to claim 1, further comprising a predetermined deceleration degree setting step for determining said predetermined deceleration degree based on a minimum margin time and a target vehicle-to-vehicle time, said minimum margin time being equal to a minimum period of time required from a point of time when the driver of the vehicle intends to operate said brake system to decelerate the vehicle to a point of time when the driver actually start operating the brake system, said target vehicle-to-vehicle time being equal to a maximum value of a delay time that is measured from a point of time when the preceding vehicle starts being decelerated, to a point of time when the driver starts operating the brake system to decelerate the vehicle, said maximum value of the delay time being allowable to avoid collision between the preceding vehicle and the vehicle in the case where the preceding vehicle and the vehicle are decelerated at the same deceleration degree.

3. A vehicle running control method according to claim 2, wherein the vehicle starts being decelerated in said braking control step before said target vehicle-to-vehicle time elapses after the start of deceleration of the preceding vehicle.

4. A vehicle running control method according to claim 3, wherein a margin time is set to be longer than said target vehicle-to-vehicle time in said braking control step, said margin time being a period of time it takes from the start of deceleration of the preceding vehicle to a point of time when the driver is required to operate said brake system so as to avoid collision with the preceding vehicle.

5. A vehicle running control apparatus according to claim 4, wherein said margin time set in said braking control step is increased with a decrease in the deceleration degree of the preceding vehicle.

6. A vehicle running control method according to claim 2, further comprising a step of determining in advance said target vehicle-to-vehicle time according to a running speed of the vehicle.

7. A vehicle running control method according to claim 1, further comprising:
  a speed detecting step of detecting a running speed-of the vehicle;
  a distance detecting step of detecting a distance between the preceding vehicle and the vehicle; and
  a deceleration determining step of determining whether the vehicle needs to be decelerated or not, based on at least the running speed of the vehicle and the distance between the preceding vehicle and the vehicle,
  wherein said target deceleration degree calculating step is executed to calculate the target deceleration degree when it is determined in said deceleration determining step that the vehicle needs to be decelerated.

8. A vehicle running control method according to claim 7, further comprising:
  an engine control step of controlling an output of an engine installed in the vehicle,
  wherein the output of the engine is reduced in said engine control step when it is determined in said deceleration determining step that the vehicle needs to be decelerated.

9. A vehicle running control apparatus according to claim 1, further comprising:
  a vehicle speed detecting step of detecting a running speed of the vehicle;
  a distance detecting step of detecting a distance between the preceding vehicle and the vehicle;
  a preceding vehicle speed detecting step of detecting a running speed of the preceding vehicle; and
  a target following distance setting step of setting a target following distance in accordance with at least one of the running speed of the vehicle and the running speed of the preceding vehicle;
  wherein the target deceleration degree is calculated in said target deceleration degree calculating step, based on the running speed of the vehicle, the distance between the preceding vehicle and the vehicle, the running speed of the preceding vehicle, the deceleration degree of the preceding vehicle, and the target following distance.

10. A vehicle running control apparatus for a motor vehicle, comprising:
  a brake system that applies braking force to the vehicle, said brake system being allowed to be manipulated by a driver of the vehicle;
  an actuator that drives said brake system independently of an operation of the driver;
  preceding vehicle deceleration degree detecting means for detecting deceleration degree of a preceding vehicle that runs in front of the vehicle;
  target deceleration degree calculating means for calculating a target deceleration degree of the vehicle in accordance with the deceleration degree of the preceding vehicle; and
  braking control means for controlling an operation of said actuator, said braking control means operating said actuator so as to drive said brake system to generate the braking force hat corresponds to said target deceleration degree when the target deceleration degree is smaller than a predetermined deceleration degree, said braking control means operating the actuator so as to drive the brake system to generate the braking force that corresponds to said predetermined deceleration degree when the target deceleration degree is not smaller than the predetermined deceleration degree.

11. A vehicle running apparatus according to claim 10, wherein said predetermined deceleration degree is determined based on a minimum margin time and a target vehicle-to-vehicle time, said minimum margin time being equal to a minimum period of time required from a point of time when the driver of the vehicle intends to operate said brake system to decelerate the vehicle to a point of time when the driver actually start operating the brake system, said target vehicle-to-vehicle time being equal to a maximum value of a delay time that is measured from a point of time when the preceding vehicle starts being decelerated, to a point of time when the driver actually starts operating the brake system to decelerate the vehicle, said maximum value of the delay time being allowable to avoid collision between the preceding vehicle and the vehicle in the case where the preceding vehicle and the vehicle are decelerated at the same deceleration degree.

12. A vehicle running control apparatus according to claim 11, wherein said braking control means starts decelerating the vehicle before said target vehicle-to-vehicle time elapses after the start of deceleration of the preceding vehicle.

13. A vehicle running control apparatus according to claim 12, wherein said braking control means sets a margin time to be longer than said target vehicle-to-vehicle time, said margin time being a period of time it takes from the start of deceleration of the preceding vehicle to a point of time when the driver is required to operate said brake system so as to avoid collision with the preceding vehicle.

14. A vehicle running control apparatus according to claim 13, wherein said margin time is increased with a decrease in the deceleration degree of the preceding vehicle.

15. A vehicle running control apparatus according to claim 14, wherein said target vehicle-to-vehicle time is determined in advance according to a running speed of the vehicle.

16. A vehicle running control apparatus according to claim 10, further comprising:

a speed sensor which detects a running speed of the vehicle;

a distance sensor which detects a distance between the preceding vehicle and the vehicle; and a deceleration determining means for determining whether the vehicle needs to be decelerated or not, based on at least the running speed of the vehicle and the distance between the preceding vehicle and the vehicle, wherein said target deceleration degree calculating means calculates the target deceleration degree when said deceleration determining means determines that the vehicle needs to be decelerated.

17. A vehicle running control apparatus according to claim 16, further comprising:

engine control means for controlling an output of an engine installed on the vehicle, wherein said engine control means reduces the output of the engine when said deceleration determining means determines that the vehicle needs to be decelerated.

18. A vehicle running control apparatus according to claim 10, further comprising:

a speed sensor which detects a running speed of the vehicle;

a distance sensor which detects a distance between the preceding vehicle and the vehicle;

preceding vehicle speed detecting means for detecting a running speed of the preceding vehicle; and a target following distance setting means for setting a target following distance in accordance with at least one of the running speed of the vehicle and the running speed of the preceding vehicle;

wherein said target deceleration degree calculating means calculates the target deceleration degree based on the running speed of the vehicle, the distance between the preceding vehicle and the vehicle, the running speed of the preceding vehicle, the deceleration degree of the preceding vehicle, and the target following distance.

* * * * *